July 18, 1950 M. G. NICHOLSON, JR 2,515,791

CIRCUIT FOR CAPACITY MICROPHONES OR PICKUPS

Filed Dec. 15, 1945

INVENTOR
Madison G. Nicholson Jr.
BY C. G. Norton
ATTORNEY

Patented July 18, 1950 2,515,791

UNITED STATES PATENT OFFICE 2,515,791

CIRCUIT FOR CAPACITY MICROPHONES OR PICKUPS

Madison G. Nicholson, Jr., Snyder, N. Y., assignor to Colonial Radio Corporation, Buffalo, N. Y.

Application December 15, 1945, Serial No. 635,275

2 Claims. (Cl. 332—56)

This invention relates to improved operating circuits for condenser microphones, condenser phonograph pickups, and similar apparatus, employing a pair of capacity elements which are vibrated mechanically or acoustically to produce an electrical wave which is more or less a counterpart of the acoustic or mechanical vibrations.

Apparatus of this type as conventionally constructed and operated suffers from certain defects, among which may be mentioned an undesirably high ratio of noise to desired signal, the necessity for extremely careful and, therefore, expensive filtering, and, in cases where the microphone or pickup is used to produce modulation of radio frequency currents, a relatively low percentage of modulation.

In accordance with my invention, I eliminate or greatly reduce all of these drawbacks. By the application of my invention, I am able to produce an operating circuit employing a condenser microphone, phonograph pickup, or the like, which will deliver an electrical output, the signal component of which is extremely high compared to the noise component (high signal-to-noise ratio), in which little or no filtering is required, and with which, when the variable capacity element is employed as a modulator of radio frequency oscillations, 100% modulation may easily be obtained, and all of this at little or no increase in cost over existing arrangements, and in some cases a considerable decrease in cost.

It will, therefore, be seen that among the objects of my invention are:

To provide a capacity-condenser microphone or pickup circuit which will deliver an electrical output having a high signal-to-noise ratio.

To provide such apparatus which is relatively free from the conditions which cause noise in conventional circuits.

To provide such apparatus in which, although the actual capacity of the phonograph pickup or microphone may be very small in comparison with the remaining capacity of the circuit, high percentages of modulation up to 100% may be obtained.

Still other objects and advantages of my invention will be apparent from the specification.

Figure 1:
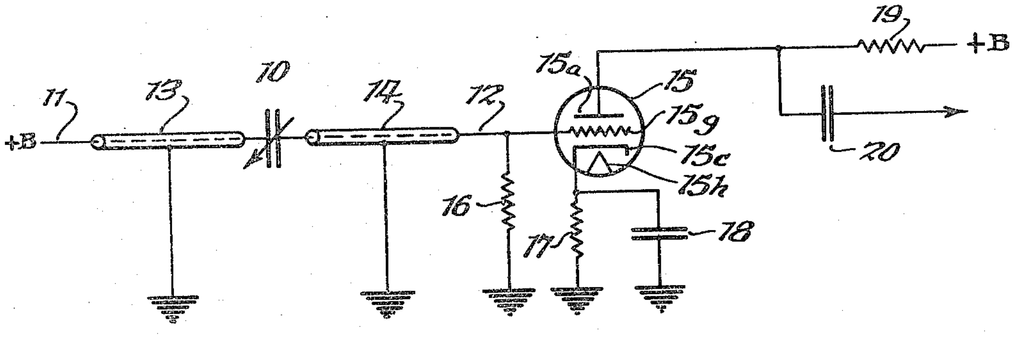
Figure 2:
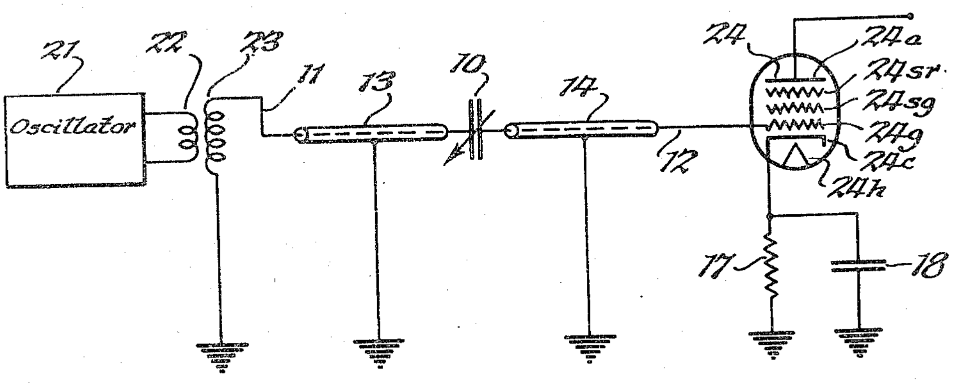
Figure 3:
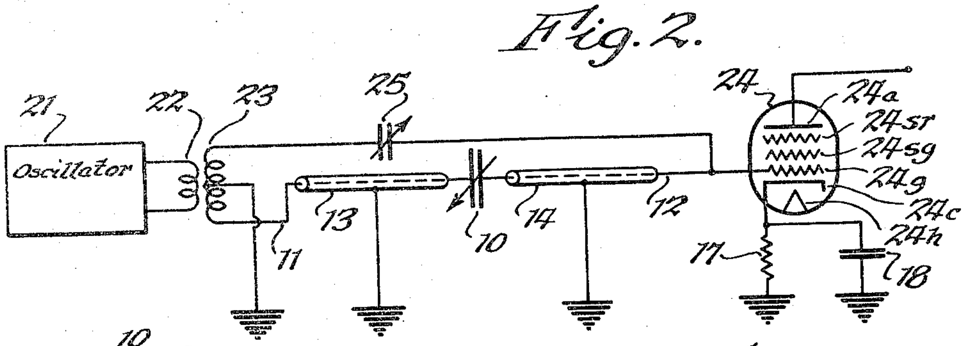
Figure 4:
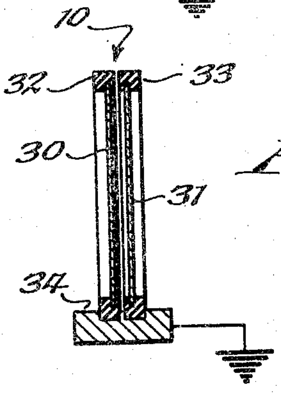

The features of novelty which I believe to be characteristic of my invention are set forth with particularity in the appended claims. My invention itself, however, both as to its fundamental principles and as to its particular embodiments, will best be understood by reference to the specification and accompanying drawing, in which Fig. 1 is a circuit diagram of a circuit in accordance with my invention, employing a condenser microphone or pickup to feed an audio amplifier, Fig. 2 is a similar diagram showing one circuit which may be employed for producing amplitude modulation of a radio frequency oscillation by the condenser microphone or pickup, Fig. 3 is a circuit similar to Fig. 2, but modified in a manner to provide an increasing percentage of modulation over that of Fig. 2, and Fig. 4 is a cross-section of a condenser microphone or phonograph pickup in accordance with the principles of my invention.

In circuits of the type to which this invention is addressed, it has heretofore been customary to use a shielded and grounded cable to protect the output from the condenser microphone or pickup, up to the point where it is impressed on the input circuit of the amplifier, which is usually one or more stages, each stage employing a thermionic vacuum tube, usually of the high gain type.

Ordinarily the polarizing voltage is applied to the shielded lead which extends from the microphone or pickup to the control grid of the amplifier. Any leakage occurring from this conductor to the shielded cable manifests itself as noise and is likely to be serious, since it occurs in the circuit to which the control grid of the amplifier is connected.

Moreover, because of this connection, it has heretofore been necessary to provide very effective filtering on the polarizing voltage supply side, because any hum or other irregularity in polarizing voltage is impressed directly upon the grid of the tube and amplified.

A further defect of conventional circuits is that the capacity and the variation in capacity obtainable in the condenser microphone and especially in the condenser phonograph pickup is likely to be only a very small part of the total capacity of the circuit and, therefore, only a very low percentage modulation is obtainable, this resulting in low efficiencies of transmission and reception of the modulated waves.

Referring now more particularly to Fig. 1, in which I have illustrated the application of my invention to a circuit in which the microphone or pickup feeds an audio frequency amplifier, 10 represents the condenser microphone, phonograph pickup, or the like. Polarizing voltage may be impressed upon one electrode of condenser 10 through conductor 11, which may be connected to a suitable source, such as +B. The other electrode of condenser 10 may be connected through conductor 12 to control electrode 15g of vacuum tube amplifier 15, which may include cathode 15c, heater 15h, control electrode 15g, and anode 15a.

Conductor 12 may be connected to ground through resistor 16 of suitable value, cathode 15c may be connected to ground through resistor 17 shunted by condenser 18, and anode 15a may be connected through resistance 19 to +B, —B being connected to ground.

The audio frequency output of amplifier 15 may be taken off through condenser 20 to any suitable circuit, such as the second stage of amplification, or may be impressed upon an indicator, such as a loud speaker (not shown). Surrounding conductor 11 there is provided grounded shield 13, and surrounding conductor 12 a similar grounded shield 14, these shields extending as nearly as possible to the ends of their conductors.

While, for simplicity of illustration, the shields are indicated as cylindrical elements, it will be understood that ordinary shielded cable may be employed, conductor 11 and its shield 13 and conductor 12 and its shield 14 being simply pieces of ordinary shielded wire or cable, such as is available commercially.

In operation, sounds falling on condenser 10 when it is a microphone, or vibration of one of the elements when it is a phonograph pickup, vary the capacity of condenser 10 and thereby vary the voltage between the control electrode and cathode of tube 15. This variation in voltage is amplified by tube 15 and delivered to the output through condenser 20, or it may be further amplified or impressed upon a loud speaker.

It will be observed, with reference to Fig. 1, that the high potential has been removed from conductor 12, which is connected directly to control electrode 15g of tube 15 and, therefore, there is no possibility of high voltage leakage from conductor 12 to shield 14, which would produce noise. Since the only voltage appearing on conductor 12 is relatively very small, there is little likelihood of any noise being produced by leakage from this conductor. Leakage may, of course, occur between conductor 11 and shield 13, but it will be observed that this will not impress any noise voltage on conductor 12 and the control electrode of tube 15.

Because the polarizing voltage no longer appears on conductor 12, it is no longer necessary to provide the expensive filtering heretofore necessary. Any B supply which will give satisfactory operation of tube 15 will in general give satisfactory operation as a source of polarizing potential when applied to conductor 11.

To preserve the benefits thus far obtained, it is desirable that no leakage occur between the elements or electrodes of condenser 10, and this is best accomplished by mounting each plate or element on a separate insulator, these insulators in turn being mounted on a metal plate maintained at the circuit ground potential. Such an arrangement is shown in Fig. 4, in which electrodes 30 and 31 represent the condenser or pickup capacity plates.

Plate 30 may be mounted in insulating ring 32, and plate 31 in insulating ring 33, and each of these insulators is separately mounted in conducting plate 34, connected to ground. Thus, any leakage which occurs in the microphone or pickup will be from respective elements 30—31 to ground, and there will be no leakage between elements 30 and 31.

Referring now more particularly to Fig. 2, in which like reference numerals designate like parts, as in Fig. 1, it is desired that microphone or pickup 10 be operated to produce amplitude modulation of a radio frequency oscillation. The radio frequency oscillation to be modulated may be obtained from oscillator 21, which may be of any suitable type, supplying oscillations to inductance 22, coupled to inductance 23 connected between one end of conductor 11 and ground, the other end of conductor 11 being connected, as before, to one side of condenser 10.

Tube 15 may now be replaced by tube 24, which may be a detector, herein illustrated as a pentode, having cathode 24c, heater 24h, control grid 24g, screen grid 24sg, suppressor 24sr, and anode 24a. For simplicity of illustration, the connections of screen 24sg and suppressor 24sr are omitted since they are well known.

With this circuit it will be observed that the capacity of neither shielded cable 13 nor 14 adds to the transmission of voltage to detector 24, the residual transmission being dependent only upon the residual capacitance of the plates of condenser 10. The percentage modulation obtainable from this circuit is equal to the percentage variation in capacity of condenser 10 caused by sounds falling upon it, or by the action of the needle riding in the record groove.

A typical value of residual capacitance in such a circuit is 1 mmf., while the variation of the capacity may be as low as 0.1 mmf. Thus, the percentage modulation of the wave arriving at detector 24 may be as much as 10%, whereas with conventional circuits, such as heretofore employed, the percentage would be much less than 1% for a typical shielded cable capacity of 50 mmf.

However, still higher percentages of modulation are obtainable if the circuit shown in Fig. 2 is modified to the form shown in Fig. 3. In this instance, the residual value of the capacity of microphone or pickup 10 may be nearly balanced out as by grounding inductance 23 at or near its midpoint, connecting one end of inductance 23 to conductor 11 as before, and connecting the other end of inductance 23 through condenser 25, nearly equal to the value of the residual capacity of condenser 10, to conductor 12 at or near the point of its connection to the control electrode of tube 24.

The balance is not at all critical because only a part of the residual capacity of condenser 10 is being balanced out, and the capacity of shields 13 and 14 does not enter into the balance.

In the specification I have explained the principles of my invention and the best mode in which I have contemplated applying those principles, so as to distinguish my invention from other inventions; and I have particularly pointed out and distinctly claimed the part, improvement, or combination which I claim as my invention or discovery.

While I have shown and described certain preferred embodiments of my invention, it will be understood that modifications and changes may be made without departing from the spirit and scope thereof, as will be clear to those skilled in the art.

I claim:

1. A modulation system comprising, in combination, a source of radio frequency oscillations to be modulated, an electro-mechanical translating device having a pair of capacity elements, a thermionic vacuum tube having a cathode, a control electrode, and an anode, a shielded conductor extending from one of said elements to said control electrode, an inductance having the intermediate point thereof grounded, a second shielded conductor extending from one end of said inductance to the other of said capacity elements, and a conducting path extending from the other end of said inductance to said control electrode, said path having interposed therein a capacity of such magnitude as to partially balance out the mean capacity of said translating device.

2. The combination claimed in claim 1, in which said last mentioned capacity is adjustable to control the percentage modulation.

MADISON G. NICHOLSON, Jr.

REFERENCES CITED

The following references are of record in the file of this patent:

UNITED STATES PATENTS

| Number | Name | Date |
|---|---|---|
| 1,467,596 | Wold | Sept. 11, 1923 |
| 1,639,000 | Horton | Aug. 16, 1927 |
| 1,817,612 | Craig | Aug. 4, 1931 |
| 1,872,858 | Whiting | Aug. 23, 1932 |
| 2,368,036 | O'Brien | Jan. 23, 1945 |
| 2,371,373 | Badmaieff | Mar. 13, 1945 |
| 2,386,049 | Hausy | Oct. 2, 1945 |
| 2,412,023 | Woll | Dec. 3, 1946 |